United States Patent [19]

Tanabe et al.

[11] 4,181,197

[45] Jan. 1, 1980

[54] AC ELEVATOR SPEED CONTROL SYSTEM

[75] Inventors: Tomio Tanabe; Muneo Nishiwaki, both of Inazawa, Japan

[73] Assignee: Mitsubishi Denki Kabushiki Kaisha, Tokyo, Japan

[21] Appl. No.: 895,463

[22] Filed: Apr. 11, 1978

[30] Foreign Application Priority Data

Apr. 15, 1977 [JP] Japan .................................. 52-43890

[51] Int. Cl.² ............................................. H02P 1/40
[52] U.S. Cl. .................................. 187/29 R; 318/758; 318/762; 318/741
[58] Field of Search .................. 187/29; 318/203, 204, 318/211, 212

[56] References Cited

U.S. PATENT DOCUMENTS

| 3,805,133 | 4/1974 | Hatakeyama et al. | 318/211 |
| 3,860,093 | 1/1975 | Mitsui et al. | 187/29 |
| 3,876,918 | 4/1975 | Komuro et al. | 318/211 X |
| 3,918,552 | 11/1975 | Kameyama et al. | 187/29 |
| 3,921,046 | 11/1975 | Anzai et al. | 187/29 |
| 4,072,212 | 2/1978 | Terazono et al. | 187/29 |
| 4,083,431 | 4/1978 | Oohira et al. | 187/29 |

Primary Examiner—Gene Z. Rubinson
Assistant Examiner—W. E. Duncanson, Jr.
Attorney, Agent, or Firm—Wenderoth, Lind & Ponack

[57] ABSTRACT

A bidirectional triode thyristor is connected to an R phase of a three-phase induction motor through an up contact set and to its S phase through a down contact set. A full-wave rectifier bridge including four diodes is connected across the R and S phases to be enabled during deceleration of the motor. The thyristor is controlled by an R-to-S phase firing circuit responsive to a command acceleration signal during acceleration of the motor and a difference signal between a command deceleration signal and an actual speed signal for the motor during deceleration of the motor.

12 Claims, 9 Drawing Figures

AC ELEVATOR SPEED CONTROL SYSTEM

BACKGROUND OF THE INVENTION

This invention relates to improvements in an AC elevator speed control system employing an induction motor.

AC feedback controlled elevator cars are generally driven by a three-phase induction motor and the primary voltage control is controlled in order to control the driving torque provided by the induction motor. The primary voltage control may be either a balanced voltage control employing controlled rectifiers such as thyristors connected between the three-phase induction motor and each phase of an associated three-phase AC source or an unbalanced voltage control employing a controlled rectifier or rectifiers similarly connected to one or two of the respective phases. The three- or two-phase control can control the torque from null to the three-phase magnitude so that an associated elevator car can be controlled while a comfortable ride therein is maintained. The accelerated elevator car is generally decelerated through a DC braking control. These controls permit the induction motor to be efficiently operated but result in an increase in the number of controlled rectifiers and the components forming the circuits for controlling them. Thus the resulting speed control systems have inevitably been expensive.

There have already been proposed AC elevator speed control systems employing single-phase control to decrease further the number of components involved. In single-phase control, a unidirectional thyristor is connected to one phase, for example, the R phase of a three-phase induction motor and a similar thyristor is connected across the R and S phases thereof while a pair of rectifier elements such as semiconductor diodes are connected to the S phase and across the R and S phases of the motor respectively. When the induction motor is operated in the DC braking mode to decelerate the associated elevator car, each of the thyristors have applied thereacross an R-to-S phase voltage during the ascent of the car and an R-to-T phase voltage during the descent of the car. On the other hand, in order to broaden the range in which the braking torque can be controlled, it has been desirable to render the voltage across each of the thyristors identical to a synchronizing voltage for their firing circuits during either of the ascent or the descent of the elevator car. This has resulted in the necessity of operatively coupling an R-to-S phase firing circuit and an R-to-T phase firing circuit to both thyristors respectively which is attended with an increase in the number of components. Thus a single-phase control is not yet economically satisfactory.

Accordingly it is an object of the present invention to provide a new and improved AC elevator speed control system capable of broadening the range over which the torque produced by an induction motor can be controlled with an inexpensive circuit configuration.

SUMMARY OF THE INVENTION

The present invention provides an AC elevator speed control system comprising an induction motor including at least one phase, a semiconductor controlled rectifier connected to the at least one phase of the induction motor, a rectifier circuit composed of semiconductor rectifier elements arranged in a bridge and connected across terminals of the induction motor, the rectifier circuit being controlled by the semiconductor controlled rectifier to convert an alternating current to a direct current, and a control means for controlling the voltage applied across the induction motor by the semiconductor controlled rectifier during acceleration of the induction motor and by both the semiconductor controlled rectifier and the rectifier circuit during deceleration of the induction motor.

BRIEF DESCRIPTION OF THE DRAWINGS

The present invention will become more readily apparent from the following detailed description taken in conjunction with the accompanying drawings in which.

DESCRIPTION OF THE PREFERRED EMBODIMENT

Figure 1:
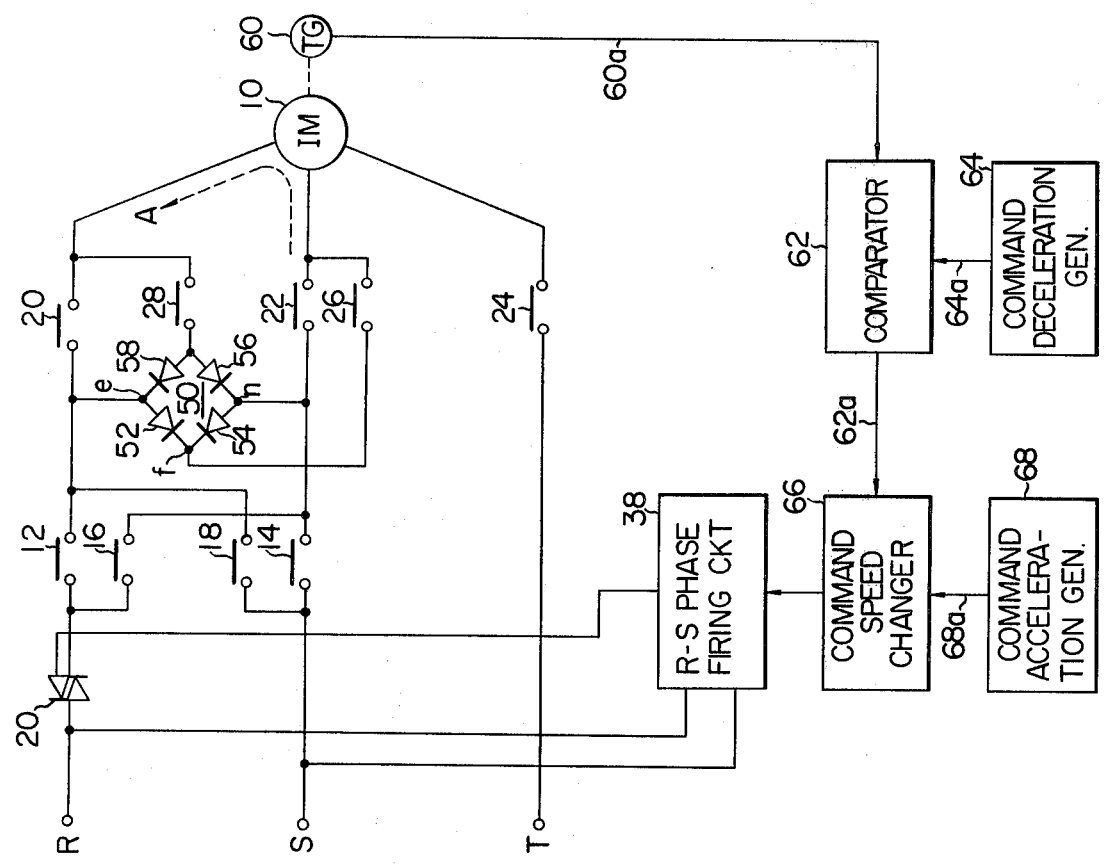
FIG. 1 is a combined circuit and block diagram of a conventional AC elevator speed control system.

Referring now to FIG. 1 of the drawings, there is illustrated a conventional AC elevator speed control system. The arrangement illustrated comprises an electric source of three-phase alternating current represented by three source terminals R, S and T and a three-phase induction motor 10 connected to the three-phase source R, S, T through networks shown in FIG. 1. The networks includes contact sets 12, 14, 16, 18, 20, 22, 24, 26 and 28, semiconductor controlled rectifiers (which are abbreviated hereinafter to SCR's) 30 and 32 such as thyristors and semiconductor rectifier diodes 34 and 36.

The contact sets 12 and 14 are controlled by an up relay (not shown) to be put in their closed positions during the ascending travel of the associated elevator car (not shown). The contact sets 16 and 18 are controlled by a down relay (not shown) to be put in their closed positions during the descending travel of the elevator car. The contact sets 20, 22 and 24 are controlled by a running relay (not shown) to be put in their closed positions when the elevator car is accelerating or traveling at a constant speed and in their open positions when the elevator car is decelerating. The contact sets 26 and 28 are controlled by a deceleration relay (not shown) to be put in their closed positions upon the elevator car reaching its deceleration point.

The SCR's 30 and 32 include respective gate electrodes connected to both an R-to-S phase firing circuit 38 connected across the source terminals R and S and an R-to-T phase firing circuit 40 connected across the source terminals R and T. A switching circuit 42 is connected to both firing circuits 38 and 40 to enable either firing circuit to control the firing of the SCR's 30 and 32 as the case may be.

Assuming that the elevator car (not shown) is traveling in an upward direction, the up contact sets 12 and 14 and the running contact sets 20, 22 and 24 are put in their closed positions. The switching circuit applies an output to the firing circuit 38 to enable the latter to control the firing of the SCR's 30 and 32. Under these circumstances, a three-phase AC voltage from the source terminals R, S and T is supplied to the three-phase motor 10 to operate the latter in the power running mode. Thus the torque produced by the motor 10 operated in the power running mode is controlled by the SCR's 30 and 32 to accelerate the elevator car (not shown). After the elevator car has been completed its acceleration, it continues to travel upwardly at a predetermined constant speed.

When the elevator car reaches its deceleration point, the running contact sets 20, 22 and 24 are put in their open positions while the deceleration contact sets 26 and 28 are put in their closed positions. This completes both a current path traced from the source terminal R, through the SCR 30, the motor 10, the diode 36, the up contact 12 and thence to the source terminal S and a current path traced from the source terminal S through the up contact set 12, the decelerating contact set 26, the diode 34, the motor 10, the decelerating contact set 28, the SCR 32 and thence to the source terminal R. Therefore a direct current flows through the motor 10 in the direction of the dotted arrow A. As a result, the motor 10 produces a braking torque. This direct current is controlled by the SCR's 30 and 32 resulting in the control of the braking torque.

Assuming that the elevator car is traveling in a downward direction, the down contact sets 16 and 18 and the running contact sets 20, 22 and 24 are put in their closed positions while the switching circuit 42 delivers an output to the firing circuit 40 to enable the latter to control the firing of the SCR's 30 and 32. Therefore the torque produced by the motor 10 operated in the power running mode and the torque produce by the motor 10 operated in the braking mode are controlled in a similar manner to that described above in conjunction with the ascent of the elevator car.

From the foregoing it is seen that, during the deceleration of the motor or when the motor is subjected to DC braking, the AC voltage applied across both of the SCR's 30 and 32 is an R-to-S phase voltage during the ascent of the elevator car and an R-to-T phase voltage during the descent thereof. On the other hand, in order to increase the range in which the braking torque is controlled during DC braking, it is desirable to render the voltage across both of the SCR's 30 and 32 identical to the synchronizing voltage for the circuit firing each of those SCR's. This necessitates using both the R-to-S phase firing circuit 38 and the R-to-T phase firing circuit 40 which increases the number of components. Thus arrangement of FIG. 1 is not yet economically satisfactory.

The present invention contemplates elimination the disadvantages of the prior art practice as described above by the provision of an AC elevator speed control system capable of broadening the range in which the torque produced by an induction motor is controlled with an inexpensive construction.

Figure 2:
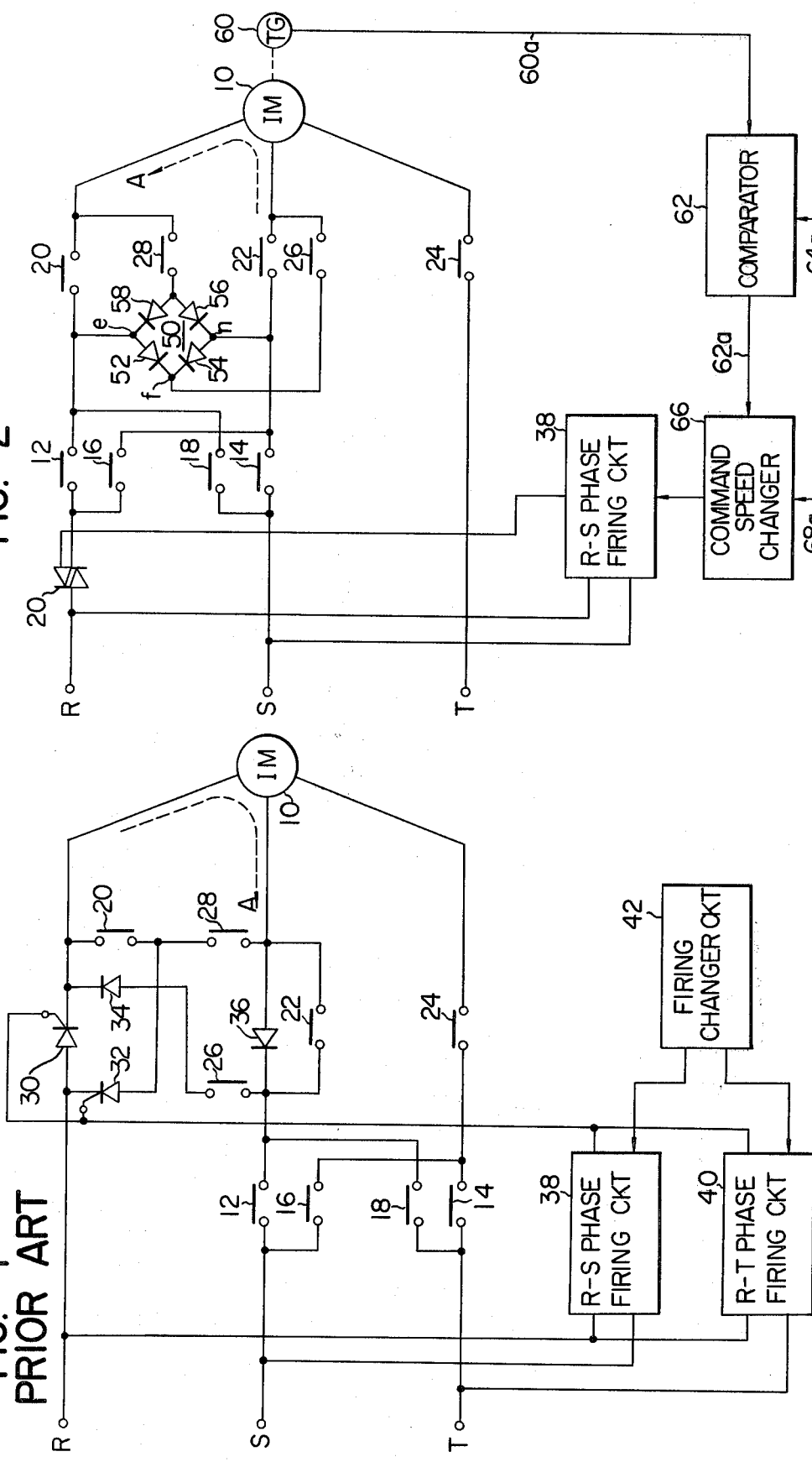
FIG. 2 is a combined circuit and block diagram of an AC elevator speed control system constructed in accordance with the principles of the present invention.

In FIG. 2, wherein like reference numerals designate the components identical to or similar to those shown in FIG. 1, there is illustrated one embodiment according to the AC elevator speed control system of the present invention. The arrangement illustrated comprises the SCR 20 which is a bidirectional triode thyristor connected at one of the main electrodes to the three-phase induction motor 10 through a serial interconnection of the up contact set 12 and the running contact set 20. The motor 10 is connected to the source terminal S through a serial interconnection of the running contact set 22 and the up contact set 14 and also to the source terminal T through the running contact set 24.

The first main electrode of the SCR 20 is connected via the down contact set 16 to the a lead interconnecting the contact sets 14 and 22, and the source terminal S is also connected via the down contact set 18 to a lead interconnecting the contact sets 12 and 20. A full-wave rectifier bridge generally designated by the reference numeral 50 includes four semiconductors 52, 54, 56 and 58 and a pair of input terminals e and h connected across the motor 10 through the running contact sets 20 and 22 respectively. The bridge 50 has a pair of output terminals f and g connected across the motor 10 through the deceleration contact sets 28 and 26 respectively.

The motor 10 is connected to a tachometer generator 60 for delivering a speed signal 60a to a comparator 62. The comparator 62 is connected to a command deceleration generator circuit 64 to receive a command deceleration signal 64a from the latter. The comparator 62 compares the actual speed signal 60a from the tachometer generator 60 with the command deceleration signal 64a from command deceleration generator circuit 64 to provide a difference signal 62a. This difference signal 62a is applied to a command speed changer circuit 66 which is also connected to a command acceleration generator circuit 68 to thereby also receive a command acceleration signal 68a from the latter.

As in the arrangement of FIG. 1, the R-to-S phase firing circuit 38 is connected across the source terminals R and S and includes the output connected to the gate electrode of the SCR 20. The firing circuit 38 is controlled by the command speed changer circuit 66.

Figure 3:
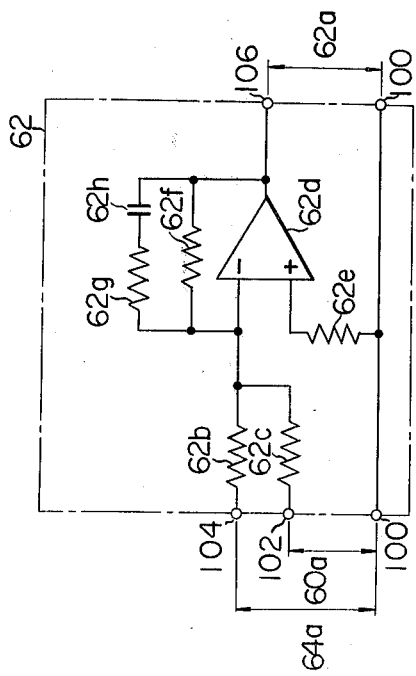
FIG. 3 is a circuit diagram of the details of the comparator shown in FIG. 2.

In FIG. 3 the comparator 62 is shown as including three input terminals 100, 102 and 104, a pair of input resistors 62b and 62c connected to input terminals 102 and 104 respectively and an operational amplifier 62d having an inverting input connected to the junction of the resistors 62b and 62c and a noninverting input connected to another input resistor 62e which is, in turn, connected to the input terminal 100.

The operational amplifier 62d includes an output connected to an output terminal 106 and also to the inverting input thereof through a feedback resistor 62f connected in parallel to a series combination of a resistor 62g and a capacitor 62h. The input terminal 100 is connected to another output terminal also designated by the reference numeral 100.

The actual speed signal 60a from the tachometer generator 60 is applied across the input terminals 102 and 100 while the command speed signal 64a from the command generator circuit 64 is applied across the input terminals 104 and 100. The operational amplifier 62d compares the signals 60a and 64a with each other to supply a difference signal 62a across the output terminals 106 and 100. The difference signal 62a has a frequency characteristic as determined by the feedback network formed of the resistors 62f and 62g and the capacitor 62h.

Figure 4:
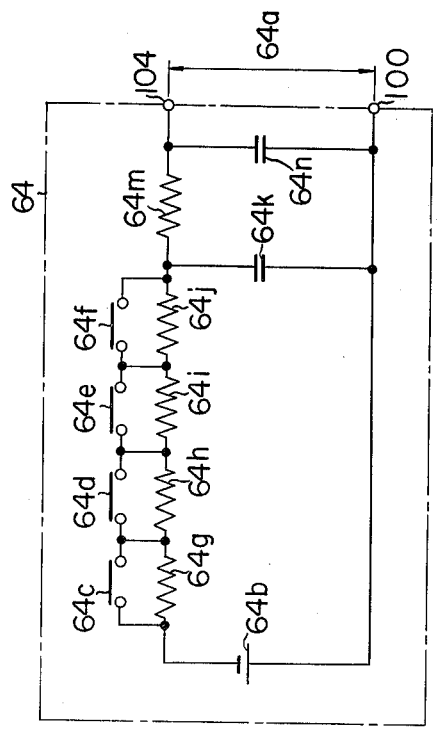
FIG. 4 is a circuit diagram of the details of the command deceleration generator circuit shown in FIG. 2.

The command speed generator circuit 64 is shown in FIG. 4 as including a DC source 64b having a positive terminal connected to an output terminal also designated by the reference numeral 100 and a negative terminal connected to a series combination of normally open contact sets 64c, 64d, 64e and 64f controlled by the deceleration relay (not shown). The normally open contact sets 64c through 64f are connected across resistors 64g, 64h, 64i, and 64j respectively, and the resistors 64j is connected to the positive side of the DC source 64b through a capacitor 64k. The junction of the resistor 64j and the capacitor 64k is connected to a resistor 64m that is connected to the positive side of the source 64 through a capacitor 64n and also to another output terminal also designated by the reference numeral 104.

It is noted that the deceleration relay is energized to close the contact sets 64c through 64f in the acceleration mode of operation.

When the motor 10 (see FIG. 2) is placed in the deceleration mode of operation, the deceleration relay successively opens the contact sets 64c through 64f to cause the source 64b to produce a stepwise decreasing DC voltage. The voltage thus produced is smoothed by an R-C filter formed of the resistors 64g through 64j and 64m and the capacitors 64k and 64n and developed across the output terminals 104 and 100 as a continuous voltage. This continuous voltage is applied across the input terminals 104 and 100 of the comparator 62.

Figure 5:
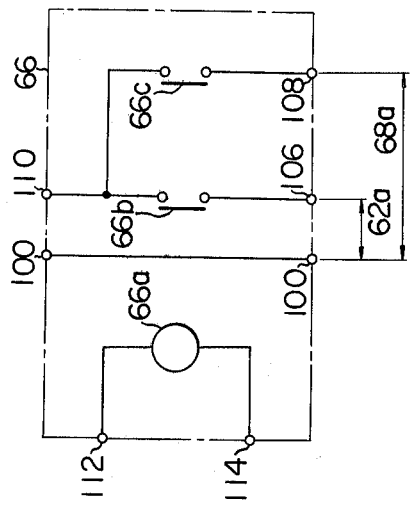
FIG. 5 is a circuit diagram of the details of the command speed changer circuit shown in FIG. 2.

The command speed changer circuit 66 has a circuit configuration such as shown in FIG. 5. In FIG. 5, the difference signal 62a from the comparator 62 is applied across a pair of input terminals also designated by the reference numerals 106 and 100 while the command acceleration signal 68a from the command acceleration generator circuit 68 is applied across a pair of input terminals 108 and 100. A command speed changing relay includes an operating winding 66a and a set of normally open contacts 66b and a set of normally closed contacts 66c connected on one side to the respective input terminals 106 and 108 and connected together on the other side to an output terminal 110. Another output terminal is directly connected to the input terminal 100 and is also designated by the reference numeral 100.

The relay winding 66a is maintained deenergized during the acceleration of the elevator car (not shown) but is energized by an output from a position sensor (not shown) applied across a pair of terminals 112 and 114 connected across the operating winding 66a.

Therefore during the acceleration of the elevator car, the command acceleration signal 68a from the command signal generator circuit 68 is developed across the output terminals 110 and 100 but, when the relay winding 66a is energized to enter the deceleration mode of operation, the contact set 66b is closed and the contact set 66c is opened. As a result, the difference signal 62a is developed across the output terminals 110 and 100.

Figure 6:
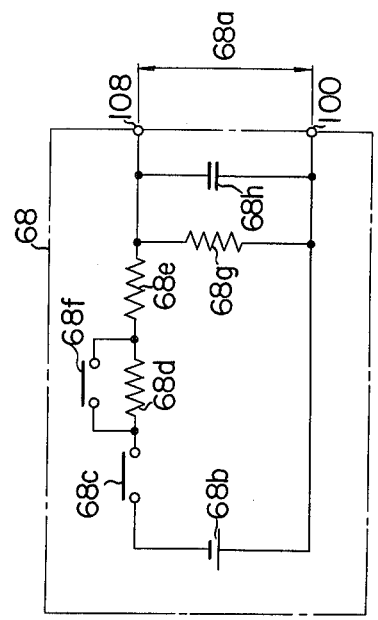
FIG. 6 is a circuit diagram of the details of the command acceleration generator speed circuit shown in FIG. 2.

The command acceleration generator circuit 68 is shown in FIG. 6 as including a DC source having a positive terminal connected to an output terminal also designated by the reference numeral 100 and a negative terminal connected to a set of normally open contacts 68c controlled by an acceleration relay (not shown). The set of normally open contacts 68c is connected to a series combination of resistors 68d and 68e subsequently connected to another output terminal also designated by the reference numeral 108.

The resistor 68d is connected across a set of normally open contacts 68f controlled by an acceleration timing relay (not shown) energized a predetermined time after the energization of the acceleration relay, and resistor 68e is connected to the positive terminal of DC source 68b through a parallel combination of a resistor 68g and a capacitor 68h.

Upon acceleration of the elevator car (not shown), the acceleration relay (not shown) is energized to close the contact set 68c to cause the source 68b to charge the capacitor 68h through the resistors 68d and 68e with a time constant as determined by the resistors 68d, 68e and 68g and the capacitor 68h. Then the contact set 68f is closed to cause the source 68 to further charge the capacitor 68h through the resistor 68e with another time constant as determined by the resistors 68e and 68g and the capacitor 68h. As a result, a command acceleration signal 68a is developed across the output terminals 108 and 100 with a stepwise varied time constant. This command acceleration signal 68a is applied across the input terminals 108 and 100 to the command speed changer circuit 66.

Figure 7:
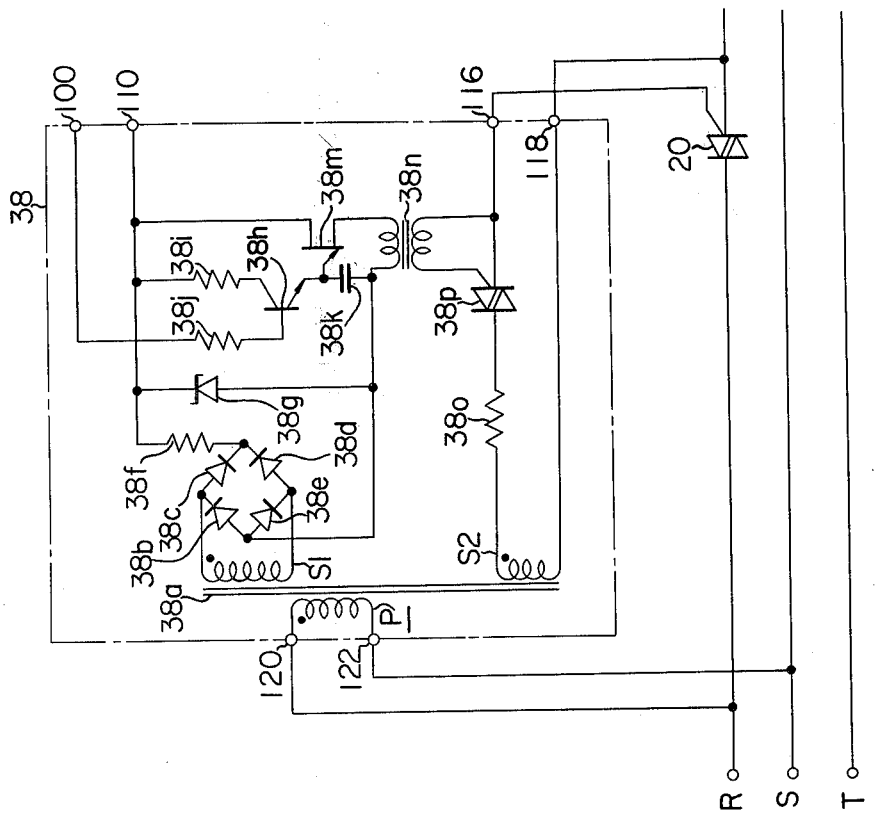
FIG. 7 is a circuit diagram of the details of the R-to-S phase firing circuit shown in FIG. 2.

The R-to-S phase firing circuit 38 had a circuit configuration such as shown in FIG. 7. In FIG. 7, an input transformer 38a includes a primary winding P connected across the source terminals of phases R and S and a pair of secondary windings S1 and S2. The dot convention is used to identify the polarity of the instantaneous voltage developed across the associated transformer windings. The secondary winding S1 is connected across a pair of AC inputs of a full-wave rectifier bridge including four semiconductor diodes 38b, 38c, 38d and 38e. The DC outputs of the full-wave rectifier bridge are connected via a resistor 38f across a Zener diode 38g.

The Zener diode 38g includes a cathode electrode connected to the resistor 38f and also to the collector electrode of an NPN transistor 38h through a collector resistor 38i that is connected to an input terminal. This input terminal is in turn connected to the output terminal 110 of the command speed changer circuit 66. Therefore this input terminal is also designated by the reference numeral 110. The transistor 38h includes a base electrode connected via a base resistor 38j to another input terminal connected to the output terminal 100 of the command speed changer circuit 66 and also designated by the reference numeral 100. The transistor 38h has its emitter electrode connected to both a capacitor 38k and the gate electrode of an unijunction transistor 38m. The capacitor 38k is connected to the anode electrode of Zener diode 38g and also to one terminal of the primary winding of a pulse transformer 38n. The other terminal of the primary winding of the pulse transformer 38n is connected to the drain electrode of the unijunction transistor 38m which has its source electrode connected to the input terminal 110.

The secondary winding S2 has one terminal connected to the output terminal 116 and through a serial connection of a resistor 38o and a bidirectional triode thyristor 38p. The other terminal of secondary winding S2 is connected to output terminal 118. The transformer 38n includes a secondary winding having one terminal connected to one of the main electrodes of bidirectional triode thyristor 38p and the other terminal connected to the gate electrode of the bidirectional triode thyristor 38p.

The output terminal 116 is connected to the gate and the output terminal 118 is connected to one of the main electrodes of the SCR or bidirectional triode thyristor 20.

In operation a secondary voltage induced across the secondary winding S1 of the input transformer 17a resulting from the AC source voltage across the source terminals R and S is full-wave rectified by the rectifier bridge 38b-38c-38d-38e and shaped into a trapezoid waveform by the Zener diode 38g. The trapezoid waveform from the Zener diode 38g is applied across the source and drain electrodes of the unijunction transistor 38m and also by the resistor 38i across the collector and emitter electrodes of the transistor 38h.

On the other hand, the base electrode of the transistor 38h receives the command acceleration signal 68a during the acceleration of the motor and the difference signal 62a through the command speed changer circuit 66 during the deceleration of the motor. Either of the two signals causes the transistor 38h to be conducting to thereby to permit the capacitor 38k to be charged from the rectifier bridge 38b-38c-38d-38e while controlling the charging current flowing into the capacitor 38k. When the charged voltage across the capacitor 38k reaches the magnitude which causes the unijunction transistor 38m to be conducting, the capacitor 38k discharges through the now conducting unijunction transistor 38m and the primary winding of the pulse transformer 38n. Thus a pulse is induced across the secondary winding of the pulse transformer 38n to bring the bidirectional triode thyristor 38p into its conducting state.

This permits a secondary voltage from secondary winding S2 of the input transformer 38a to be applied to the gate electrode of the SCR 20 to fire it.

The operation of the arrangement shown in FIG. 2 will now be described. As in the arrangement of FIG. 1, the up contact sets 12 and 14 and the running contact sets 20, 22 and 24 are put in their closed positions during the ascent of the elevator car (not shown). On the other hand, the command acceleration generator circuit 68 produces a command acceleration signal 68a increasing with time which is delivered to the firing circuit 38 through the command speed changer circuit 66. Therefore the firing circuit 38 controls the firing of the SCR 20 in response to the command acceleration signal 68a as above described in conjunction with FIG. 7 to thereby control the torque from the motor 10 operated in the power running mode. Note that the command acceleration signal 68a is so patterned that the motor 10 produces a torque sufficient to smoothly start the elevator car.

Then the power running torque from the motor 10 balances the load torque due to the ascending elevator car at a certain rotational speed of the motor 10 after which the motor 10 continues to be rotated at that rotational speed to move the elevator car upward at a corresponding constant speed.

Subsequently the elevator car reaches its deceleration point whereupon the command speed changer circuit 66 responds to the output from the position sensor (not shown) to change its output from the command acceleration signal 68a to the difference signal 62a as above described in conjunction with FIG. 5. Upon this change of the output, the SCR 20 is temporarily put in its nonconducting state. At the same time, the running contact sets 20, 22 and 24 are put in their open positions while the deceleration contact sets 26 and 28 are put in their closed positions. This completes both a current path traced from the source terminal R through the SCR 20, the closed up contact set 12, the diode 52, the closed deceleration contact set 26, the motor 10, the closed deceleration contact set 28, the diode 56, the closed up contact set 14 and thence to the source terminal S and a current path traced from the source terminal S through the closed up contact set 14, the diode 54, the closed deceleration contact set 26, the motor 10, the closed deceleration contact set 28, the diode 58, the closed up contact set 12 and the SCR 20 and thence to the source terminal R. Therefore a direct current flows through the motor 10 in the direction of the dotted arrow A and a braking torque is produced by the motor 10.

At that time, the command deceleration generator circuit 64 generates the command deceleration signal 64a in the manner as above described in conjunction with FIG. 4. The command deceleration signal 64a is applied to the comparator circuit 62 where it is compared with actual speed signal 60a from the tachometer generator 60 to provide the difference signal 62a. The difference signal 62a from the comparator circuit 62 is delivered to the firing circuit 38 through the command speed changer circuit 66. The firing circuit 38 controls the a firing angle of the SCR 20 in response to the difference signal 62a resulting in the control of the braking torque from the motor 10. Accordingly, the elevator car is smoothly decelerated.

In this connection, note that, since AC elevator cars have sufficiently large inertias, their deceleration can be controlled with a high accuracy by means of DC braking torque alone.

Figure 8:
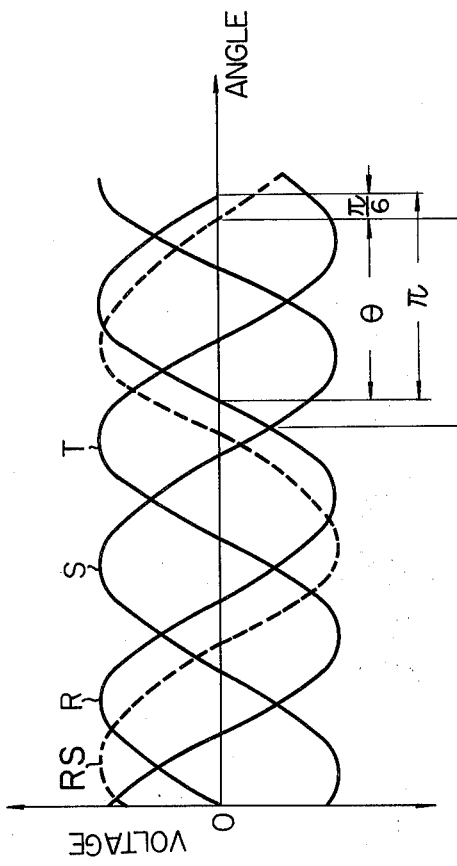
FIG. 8 is a graph illustrating voltage waveforms developed at various points in the arrangement of FIG. 2 in the running mode of operation.

The SCR will now be discussed with reference to the source phase upon changing the output from the command speed changer circuit 66 as above described. When the motor 10 is operated in the power running mode during the ascent of the elevator car with contact sets 12, 14, 20, 22 and 24 put in their closed positions, the SCR 20 has applied thereacross an R phase voltage with a sinusoidal waveform R shown in FIG. 8. FIG. 8 also shows sinusoidal waveforms S of S of the S phase voltage and T of the T phase voltage. Further the firing circuit 38 has applied thereacross an R-to-S phase voltage whose waveform RS is shown by a dashed line in FIG. 8 as leading the R phase source by a phase of $\pi/6$ radians. In general, firing circuits are not required to control the controlled rectifier throughout phase angles ranging from 0 to $\pi$ radians of the sinusoidal source and it is sufficient to control over an range from about 0 to about $5\pi/6$ radians thereof. Therefore, when the source for the firing circuit 38 has a leading phase of $\pi/6$ radian as above described, it is sufficient for the firing angle controlled by the firing circuit 38 to range from $\pi/6$ to $\pi$ radians of the R-to-S phase voltage of from 0 to $5\pi/6$ radians of the R phase voltage. This permits a voltage drop across the SCR 20 to be caused only by a forward voltage. Accordingly, the motor torque can be controlled at and adjacent to its maximum magnitude while a favorable result is exhibited for external disturbances such as a variation in source voltage.

Figure 9:
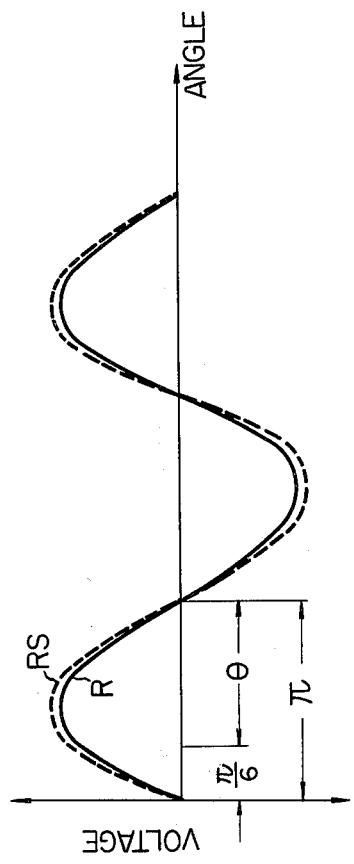
FIG. 9 is a graph illustrating voltage waveforms developed at various points in the arrangement of FIG. 2 in the deceleration mode of operation.

When the motor 10 is operated in the braking mode with the contact sets 20, 22 and 24 put in their open positions and with the contact sets 26 and 28 put in their closed positions, the motor 10 is energized through a single phase circuit including the source terminals R and S through which the firing circuit 38 is energized. Thus the SCR 20 has applied thereacross an AC voltage equal in phase to that applied across the firing circuit as shown in FIG. 9 wherein there are illustrated waveforms R the R phase voltage by a solid line and RS of the R-to-S phase voltage by a dotted line. Under these circumstances, the motor 10 can produce a DC braking torque sufficient to decelerate the elevator car (not shown) without fully firing the SCR 20. Therefore, the angular range θ between 0 and 5π/6 radians in which the firing of the SCR 20 is controlled is sufficient.

When the elevator car is descending, the down contact sets 16 and 18 are put in their closed positions as above described. Under these circumstances, the voltage applied across the SCR 20 remains unchanged from the case in which the up contact sets 12 and 14 are put in their closed positions. This means that the firing circuit 38 is required to receive only the R-to-S phase voltage. In other words, it is sufficient to control the SCR 20 by the single firing circuit 38.

Thus it is seen that, according to the present invention, a rectifier bridge including rectifier elements forms a rectifier circuit for providing a DC braking torque during the deceleration of an induction motor which is controlled by a semiconductor controlled rectifier. Therefore, the number of expensive controlled rectifiers is decreased while the rectifier circuit can be composed of a commercially available semiconductor stack or the like formed into a full-wave rectifier bridge resulting in an inexpensive speed control system.

Also, since contact sets are connected between the semiconductor controlled rectifier and the rectifier circuit to change the direction of rotation of the induction motor, only a single firing circuit is sufficient to control the semiconductor controlled rectifier. This results in a simple circuit configuration and therefore in an inexpensive construction.

While the present invention has been illustrated and described in conjunction with a single preferred embodiment thereof it is to be understood that numerous changes and modifications may be resorted to without departing from the spirit and scope of the present invention. For example, the bidirectional triode thyristor shown in FIG. 2 may replaced by a pair of unidirectional thyristors interconnected in an anti-parallel circuit relationship.

What we claim is:

1. An AC elevator speed control system comprising:
    a multiphase induction motor;
    a semiconductor controlled rectifier circuit for connection to a first phase of a multiphase AC power source for controlling an alternating current;
    a full wave rectifier circuit composed of semiconductor rectifier elements arranged in a bridge connected to said semiconductor controlled rectifier circuit for converting said controlled alternating current to a direct current; and
    a control means connected to said semiconductor controlled rectifier circuit and said rectifier circuit for supplying said controlled alternating current to said induction motor during acceleration of said induction motor and for supplying said direct current to said induction motor during deceleration of said induction motor.

2. An AC elevator speed control system as claimed in claim 1 wherein said semiconductor controlled rectifier circuit comprises a bidirectional triode thyristor.

3. An AC elevator speed control system as claimed in claim 1 wherein said semiconductor controlled rectifier circuit comprises a pair of unidirectional thyristors interconnected in an anti-parallel circuit relationship.

4. An AC elevator speed control system as claimed in claim 1, wherein:
    said rectifier circuit includes first and second input terminals, said first input terminal connected to said semiconductor controlled rectifier circuit and said second input terminal for connection to a second phase of a multiphase AC power source, and a pair of output terminals; and
    said control means comprising a set of acceleration contacts connected to said semiconductor controlled rectifier circuit and said induction motor for being placed in their closed positions during acceleration of said induction motor and a set of deceleration contacts connected to said pair of output terminals of said rectifier circuit and said induction motor for being placed in their closed positions during deceleration of said induction motor.

5. An AC elevator speed control system as claimed in claim 1, wherein said control means further comprises a command speed control circuit connected to said semiconductor rectifier circuit for providing an acceleration control signal to said semiconductor controlled rectifier circuit for control of said alternating current during acceleration of said induction motor and for providing a deceleration control signal to said semiconductor controlled rectifier circuit for control of said alternating current during deceleration of said induction motor.

6. An AC elevator speed control system as claimed in claim 5, wherein said command speed control circuit comprises:
    a command acceleration generator for generating said acceleration control signal;
    a tachometer generator driven by said induction motor for generating an actual speed signal corresponding to the actual speed of said induction motor;
    a command deceleration generator for generating a command deceleration signal;
    a comparator means connected to said tachometer generator and said command deceleration generator for generating a difference signal between said actual speed signal and said command deceleration signal, said difference signal being said deceleration control signal; and
    a command speed changer circuit connected to said semiconductor controlled rectifier circuit, said command acceleration generator and said comparator means for providing said acceleration control signal to said semiconductor controlled rectifier circuit during acceleration of said induction motor and for providing said deceleration control signal to said semiconductor controlled rectifier circuit during deceleration of said induction motor.

7. An AC elevator speed control system comprising:
    a multiphase induction motor, a semiconductor controlled rectifier circuit for connection to a first phase of a multiphase AC power source for controlling an alternating current;
    a plurality of contact sets, connected to said semiconductor controlled rectifier circuit and for connection to a second phase of a multiphase AC power source, for selective reversal of the first and second phase for changing the direction of rotation of said induction motor;
    a full wave rectifier circuit composed of semiconductor rectifier elements arranged in a bridge connected to said plurality of contact sets for converting said controlled alternating current to a direct current; and a control means for supplying said controlled alternating current to said induction motor during acceleration of said induction motor and for supplying said direct current to said induction motor during deceleration of said induction motor.

8. An AC elevator speed control system as claimed in claim 7 wherein said semiconductor controlled rectifier circuit comprises a bidirectional triode thyristor.

9. An AC elevator speed control system as claimed in claim 7 wherein said semiconductor controlled rectifier comprises a pair of unidirectional thyristors interconnected in an anti-parallel circuit relationship.

10. An AC elevator speed control system as claimed in said rectifier circuit includes a pair of input terminals connected to said plurality of contact sets and a pair of output terminals; and said control means comprises a set of acceleration contacts connected to said plurality of contact sets and said induction motor for being placed in their closed positions during the acceleration of said induction motor and a set of deceleration contacts connected to said pair of output terminals of said rectifier circuit for being placed in their closed positions during the deceleration of said induction motor.

11. An AC elevator speed control system as claimed in claim 7, wherein said control means further comprises a command speed control circuit connected to said semiconductor rectifier circuit for providing an acceleration control signal to said semiconductor controlled rectifier circuit for control of said alternating current during acceleration of said induction motor and for providing a deceleration control signal to said semiconductor controlled rectifier circuit for control of said alternating current during deceleration of said induction motor.

12. An AC elevator speed control system as claimed in claim 7, wherein said command speed control circuit comprises:

a command acceleration generator for generating said acceleration control signal;

a tachometer generator driven by said induction motor for generating an actual speed signal corresponding to the actual speed of said induction motor;

a command deceleration generator for generating a command deceleration signal;

a comparator means connected to said tachometer generator and said command deceleration generator for generating a difference signal between said actual speed signal and said command deceleration signal, said difference signal being said deceleration control signal; and a command speed changer circuit connected to said semiconductor controlled rectifier circuit, said command acceleration generator and said comparator means for providing said acceleration control signal to said semiconductor controlled rectifier circuit during acceleration of said induction motor and for providing said deceleration control signal to said semiconductor controlled rectifier circuit during deceleration of said induction motor.

* * * * *